United States Patent
Arienti et al.

(10) Patent No.: US 11,428,286 B2
(45) Date of Patent: Aug. 30, 2022

(54) BRAKE CALIPER THRUST DEVICE, BRAKE CALIPER AND MANUFACTURING METHOD

(71) Applicant: FRENI BREMBO S.P.A., Curno (IT)

(72) Inventors: Roberto Arienti, Curno (IT); Alberto Comenduli, Curno (IT); Daniele Angelo Penati, Curno (IT); Andrea Odoni, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 83 days.

(21) Appl. No.: 16/768,247

(22) PCT Filed: Nov. 28, 2018

(86) PCT No.: PCT/IB2018/059416
§ 371 (c)(1),
(2) Date: May 29, 2020

(87) PCT Pub. No.: WO2019/106570
PCT Pub. Date: Jun. 6, 2019

(65) Prior Publication Data
US 2020/0292020 A1    Sep. 17, 2020

(30) Foreign Application Priority Data

Nov. 30, 2017 (IT) .......................... 102017000138411

(51) Int. Cl.
*F16D 65/847* (2006.01)
*B60T 5/00* (2006.01)
(Continued)

(52) U.S. Cl.
CPC ............. *F16D 65/847* (2013.01); *B60T 5/00* (2013.01); *F16D 2065/789* (2013.01); *F16D 2125/06* (2013.01)

(58) Field of Classification Search
CPC ............. F16D 65/847; F16D 2065/789; F16D 2125/06; B60T 5/00
See application file for complete search history.

(56) References Cited

U.S. PATENT DOCUMENTS 3,277,985 A * 10/1966 Caskey ................. F16D 65/092
188/264 AA
4,572,334 A * 2/1986 Villata ..................... F16D 65/84
188/264 G (Continued)

FOREIGN PATENT DOCUMENTS

DE    10034364 A1    2/2002
EP    0171164 A1 *  2/1986
(Continued)

OTHER PUBLICATIONS

European Patent Office, International Search Report with Written Opinion, issued in PCT/IB2018/059416, dated Jan. 21, 2019, 9 pages, European Patent Office, Rijswijk, Netherlands.

*Primary Examiner* — Pamela Rodriguez
(74) *Attorney, Agent, or Firm* — Marshall & Melhorn, LLC (57) ABSTRACT

A brake caliper thrust device for a disc brake is provided. The brake caliper thrust device has a thrust device body adapted to be translated inside a guide device, the thrust device body defining an internal cavity at least partially open and facing towards an object to be pushed, including a brake pad associable with the thrust device. The internal cavity is delimited by at least one internal surface defined by at least one wall of the thrust device. From the at least one wall of the thrust device, at least one heat dissipation element protrudes into the internal cavity, adapted to increase the extension of the at least one internal surface to evacuate heat accumulated by the at least one wall of the thrust device.

15 Claims, 5 Drawing Sheets

(51) Int. Cl.
 *F16D 65/78* (2006.01)
 *F16D 125/06* (2012.01)

(56) References Cited

U.S. PATENT DOCUMENTS

| | | | |
|---|---|---|---|
| 4,581,985 A * | 4/1986 | Villata | F16D 65/84 188/264 G |
| 6,446,766 B1 | 9/2002 | Cornolti et al. | |
| 7,066,303 B2 | 6/2006 | Malagoli et al. | |
| 8,151,951 B2 | 4/2012 | Cornolti et al. | |
| 9,400,025 B2 | 7/2016 | Maestrini et al. | |
| 2012/0193175 A1* | 8/2012 | Wen | F16D 55/228 188/71.6 |

FOREIGN PATENT DOCUMENTS

| | | |
|---|---|---|
| EP | 1016804 A1 | 7/2000 |
| EP | 2284415 A1 | 2/2011 |
| FR | 2495252 A1 | 6/1982 |
| FR | 2937391 A1 | 4/2010 |
| WO | WO/02099305 A1 | 12/2002 |

\* cited by examiner

BRAKE CALIPER THRUST DEVICE, BRAKE CALIPER AND MANUFACTURING METHOD

FIELD OF THE INVENTION

It is the object of the present invention a brake caliper thrust device for a disc brake.

The present invention also relates to a brake caliper comprising said thrust device.

Furthermore, the present invention relates to a disc brake.

The present invention further relates to a manufacturing method of a brake caliper thrust device.

BACKGROUND ART

In a disc brake, the brake caliper is generally arranged straddling the external peripheral margin of a brake disc, adapted to rotate about an axis of rotation defining an axial direction (X-X). Furthermore, in a disc brake, a radial direction (R-R), substantially orthogonal to said axial direction (X-X) is defined, as well as a tangential or circumferential direction (C-C), orthogonal both to said axial direction (X-X), and to said radial direction (R-R).

The brake caliper usually comprises a caliper body having two elongated portions arranged so as to face opposite braking surfaces of a brake disc, and at least one bridge which connects said two elongated portions to each other and which protrudes straddling the disc. In a conventional arrangement of a disc brake on a vehicle, a braking surface of the brake disc faces towards the outside of the vehicle, defining the external side of the vehicle of the disc brake or the side facing the wheel of the vehicle, and the opposite braking surface of the brake disc faces towards the vehicle itself, defining the side facing the vehicle of the disc brake. Conventionally, the friction pads are provided arranged between each elongated portion of the caliper body and the facing brake disc braking surfaces.

Conventionally, the caliper body is made of metal, such as, for example, aluminium, or aluminium alloy, for example, aluminium and lithium, or steel, and it may be obtained by casting, but also by mechanical chip removal machining, as well as by forging. The caliper body may be produced as a single piece, or one piece, so as to reduce the number of parts to be assembled and, particularly when obtained by casting, the whole caliper body may be made with a single casting. Alternatively, the caliper body may also be manufactured into two semi-calipers which are associated with each other by means of fastening means, for example threaded, along a plane which conventionally coincides with the median plane of the disc on which the caliper is placed straddling.

In fixed caliper bodies associated with fixed discs, both elongated portions of the caliper body have a cylinder, or a plurality of cylinders, connected to a brake fluid intake channel and adapted to house hydraulic pistons capable of exerting a thrust action on the friction pads facing it or them, abutting the pads against the disc braking surfaces to exert the braking action on the vehicle.

In floating caliper bodies associated with fixed discs, only an elongated portion of the caliper body, adapted to slide axially, has a cylinder or cylinders adapted to house hydraulic pistons capable of exerting a thrust action on the friction pad facing it, abutting the pad against the braking surface of the disc, while it slides on the caliper bracket and acts on the second friction pad abutting the pad against the brake disc to exert the braking action on the vehicle.

Fixed caliper bodies associated with floating discs are also known, where only one of the elongated portions of the caliper body has a cylinder or cylinders adapted to house hydraulic pistons capable of exerting a thrust action on the friction pad facing it, abutting the pad against the braking surface of the disc, which in turn slides axially on the support thereof and abuts against the second friction pad to exert the braking action on the motor vehicle.

When braking, the pressure applied on the brake pedal by the driver of the vehicle exerts, by means of a brake pump, a pressure on the brake fluid in the hydraulic circuit placed inside the caliper body which goes up to the cylinders, typically formed by portions of the caliper body adapted to receive pistons, where the pressure is exerted on the surface of the bottom of the pistons, forcing them to close in against the pads, which in turn abut against the disc braking surfaces.

In the interface between pistons and cylinders, elastic sealing and/or roll-back gaskets are conventionally provided, i.e., gaskets which retract the piston inside the cylinder thereof by a limited predetermined stroke, thereby moving it away from the respective pad when the command to the brake pedal ceases, and therefore allowing the pad, in turn usually axially biased by a spring, to move away from the disc, minimizing the occurrence of an undesired residual torque, which is usually due to a prolonged, albeit slight, contact between the pad and the disc which determines a residual slight friction and therefore a slight braking action even once the braking command by the driver has ceased.

The brake fluid pressure action is also applied on the bottom wall of the cylinder, determining a reaction in the caliper body which deforms it by moving it away from the disc surfaces as well as, due to the constraint between the caliper and the support thereof, only placed on the caliper side of the hub side elongated element, a shear and torsion deformation which brings the elongated element not constrained to the support, or wheel side elongated element, to move with respect to the hub side elongated element, flexing the bridges of the caliper which connect these elongated elements to one another.

Furthermore, the caliper body also deforms as a function of the torque exerted by the action of the pistons, which abut the pads against the disc braking surfaces applied in directions forming torque arms with respect to the fastening points of the caliper body to the support thereof. These torques deform the caliper body also in a direction tangential and radial, as well as axial, with respect to the disc. This deformation of the caliper body leads to an increase in the stroke of the pistons and therefore to an increase in the stroke of the brake pedal.

Therefore, the need for the caliper body to have a sufficient structural rigidity is felt, so as to ensure that this deformation of the caliper body caused by the braking action is kept within tolerable values, which, in addition to avoiding damage to the braking system, does not create the feeling for the driver of a yielding braking system, resulting in an extra-stroke of the lever or pedal of the braking system creating a "spongy system" feeling.

This need encourages to have extremely rigid structures for the caliper bodies and therefore to increase the encumbrance and weight thereof, in applications where this is possible. On the other hand, the caliper body, being constrained to the suspension of the vehicle and placing itself straddling the disc, is one of the unsprung masses which should be reduced as much as possible or should be maintained constant in weight while increasing the performance of the vehicle, even when braking. Obviously, these considerations are taken to the extreme when the vehicle is of the competition type and the user desires a braking system extremely responsive to the commands thereof and, at the same time, extremely light, so as not to hinder the performance of the racing vehicle.

At the same time, the caliper body, as well as the supporting structure, must have possibly wide openings to allow the aeration of the disc brake and a rapid evacuation of the heat generated by the friction between the brake pads and the brake disc braking surfaces when braking.

This braking action on the disc brake disc exerts a considerable friction, adapted to create the desired braking torque, a friction which generates heat, causing an increase in the temperature of the brake disc, of the pads and of the caliper body, while the braking action mechanically stresses the caliper body itself deforming it as previously described. Therefore, the simultaneous increase in the temperature of the caliper body and the deformation thereof constitute the risk that the caliper body, when strongly overheated, deteriorates the mechanical resistance performance thereof.

The increase in the temperature of the pad and of the caliper body may affect the area in which the thrust devices, the cylinder-piston units, are provided, affecting the features of the brake fluid present in the intake ducts and in the cylinder chambers. In extreme cases, the brake fluid itself may be brought to a boiling, thus forming in the intake ducts or in the chamber formed between the cylinder and the piston a gaseous state which is dangerously compressible and no longer adapted to readily and promptly transfer the braking command to the pistons and, therefore, to the pads. This very dangerous phenomenon is partially solved by using brake fluids with high boiling temperatures, and caliper bodies equipped with ventilation openings adapted to heat evacuation.

Even more significant is the fact that, due to the overheating of the pad and of the caliper body, the elastic sealing and/or roll-back gaskets, provided at the interface between the piston and the cylinder, are likely to undergo a thermal stress which they are not adapted to bear, being usually made of rubber or plastic and therefore unadapted to withstand high operating temperatures, thus plastically deforming and causing a premature deterioration of the braking performance.

In case of high performance braking systems, a cooling air forced intake device, conveying air in the vicinity of the pads, is associated with the caliper body. Examples of such solutions are, for example, known from documents EP-1016804, EP-2284415 and US-2008-277216 of the same Applicant.

However, these known solutions are extremely complex to realize, assemble and maintain, especially in everyday vehicles, although being highly or very highly performing. Furthermore, the need to effectively evacuate heat is strongly felt in the case in which, in spite of the cooling obtained with the intake and circulation of air, the caliper body has accumulated heat. In fact, when the heat has unfortunately accumulated in the mass of the caliper body, the cooling times thereof, in known caliper embodiments, are very long, thus exposing the braking system, in the case of repeated braking actions of considerable magnitude, to an even greater accumulation of heat and to an increased risk of the brake fluid boiling as well as to a deterioration of the resistance performance of the caliper body construction material.

It is therefore strongly felt the need to provide a brake caliper capable of providing an adequate heat exchange performance, so as to reduce the heat accumulated by the brake caliper, without thereby reducing the resistance to deformation of the caliper body or increasing the weight or the encumbrance of the brake caliper.

At the same time, the need is strongly felt to limit the overheating of the brake caliper body, by confining as much as possible the heat transmitted from the contact area between the pad and the disc to the caliper body itself during the braking action.

The need is strongly felt to reduce the accumulation of heat arriving and remaining inside the brake caliper body and, in particular, inside the thrust devices in contact with the brake pads, as well as to limit the transmission of heat from the pads to the brake caliper body and, therefore, to the brake fluid, due to the overheating of the thrust devices.

At the same time, the need is strongly felt to provide a brake caliper which is sufficiently rigid so as to oppose the deformations deriving from the braking action and, at the same time, is adapted to provide a reduced heat accumulation.

Furthermore, the need is felt to provide a brake caliper which is lighter with respect to the known solutions with equal heat exchange and structural strength efficiency.

Solution

It is an object of the present invention to obviate the drawbacks of the background art and to provide a solution to the need of providing a brake caliper.

These and other objects are achieved by a brake caliper thrust device according to the claims, as well as by a brake caliper according to the claims, as well as by a method according to the claims, as well as by a method according to the claims.

Some advantageous embodiments are the subject of the dependent claims.

By virtue of the proposed solutions, an increase of the heat exchange surface of the brake caliper, accessible from the air surrounding the disc brake, may be obtained, without, thereby, weakening the caliper body.

By virtue of the proposed solutions, an improvement of the performance may be obtained, since the working temperature of the brake caliper decreases with respect to the working temperatures of the known brake calipers.

By virtue of the proposed solutions, an improvement may be obtained of the ventilation of the thrust devices of the brake caliper which contextually increases the thermal resistance of the thrust devices with respect to the known solutions, limiting the overheating thereof when in operating conditions.

A brake caliper thrust device in accordance with the invention is adapted for brake calipers of the fixed type and for brake calipers of the floating or sliding type.

A brake caliper as well as a disc brake in accordance with the invention is adapted to straddle a brake disc of the fixed type or of the floating type and/or of the ventilated type comprising two axially facing folders connected to each other by connecting-spacing elements, such as flaps or rods, delimiting a gap between the two facing folders.

FIGURES

Further features and advantages of the thrust device, of the brake caliper, of the disc brake and of the method in accordance with the invention will become apparent from the following description of preferred embodiments thereof, given by way of indication and not by way of limitation, with reference to the accompanying Figures, in which.

DESCRIPTION OF SOME PREFERRED EMBODIMENTS

In accordance with a general embodiment, a brake caliper thrust device 1 for a disc brake 30 comprises a thrust device body 4, adapted to be translated inside a guide device 5.

Figure 1:
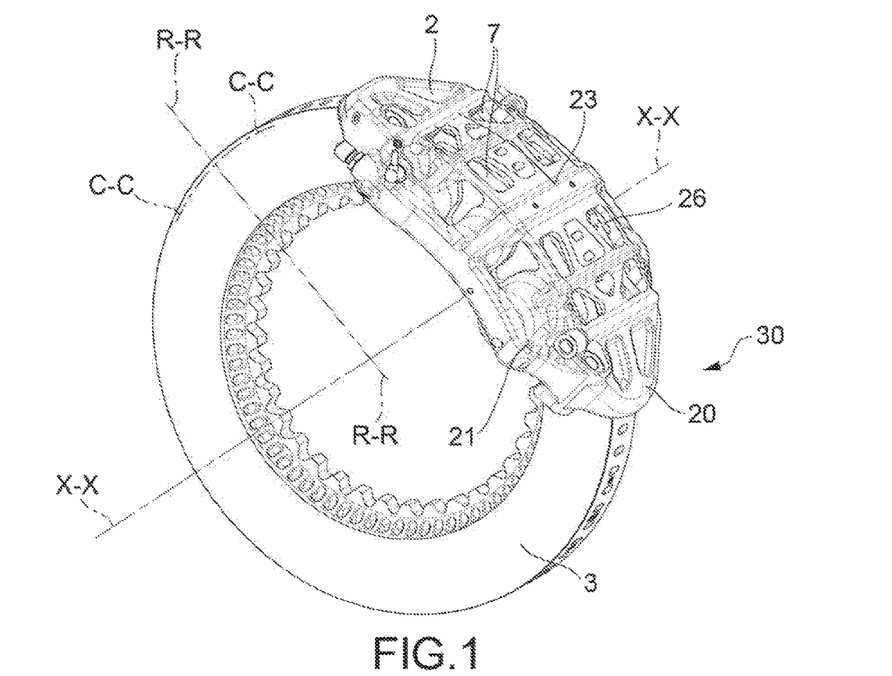
FIG. 1 shows and axonometric view of a disc brake comprising a brake caliper, according to an embodiment, placed straddling a disc brake disc.
Figure 2:
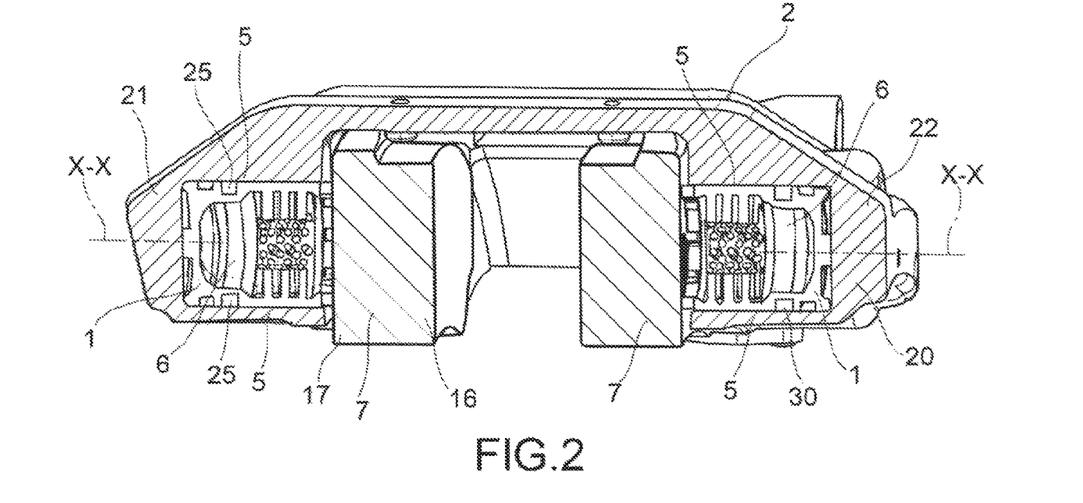
FIG. 2 shows an axonometric and sectional view of a brake caliper, according to an embodiment, in which the section is provided according to a cutting plane parallel to the radial R-R and axial X-X directions.
Figure 3:
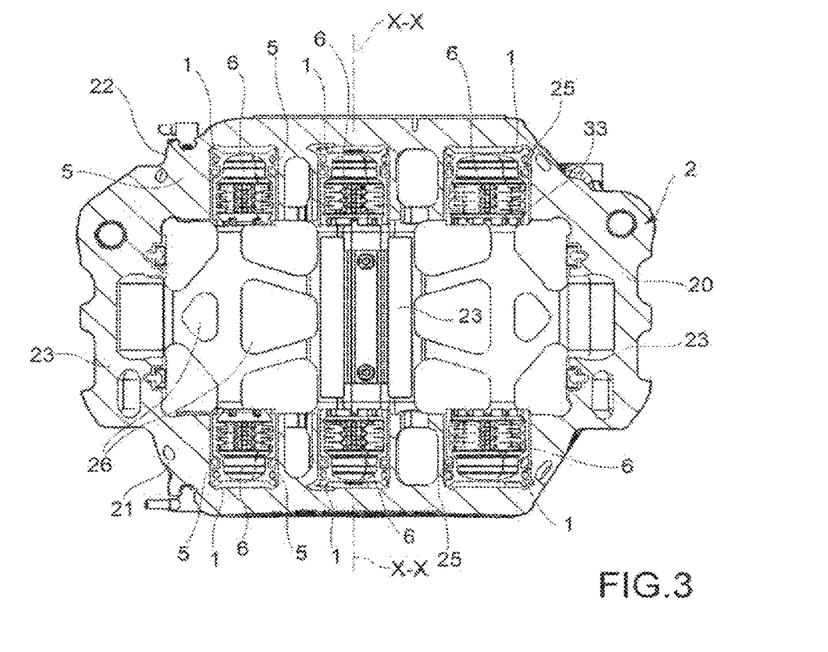
FIG. 3 shows a radially internal sectional view of the brake caliper shown in FIG. 2, in which the section is provided according to a cutting plane parallel to the circumferential C-C and axial X-X directions.
Figure 4:
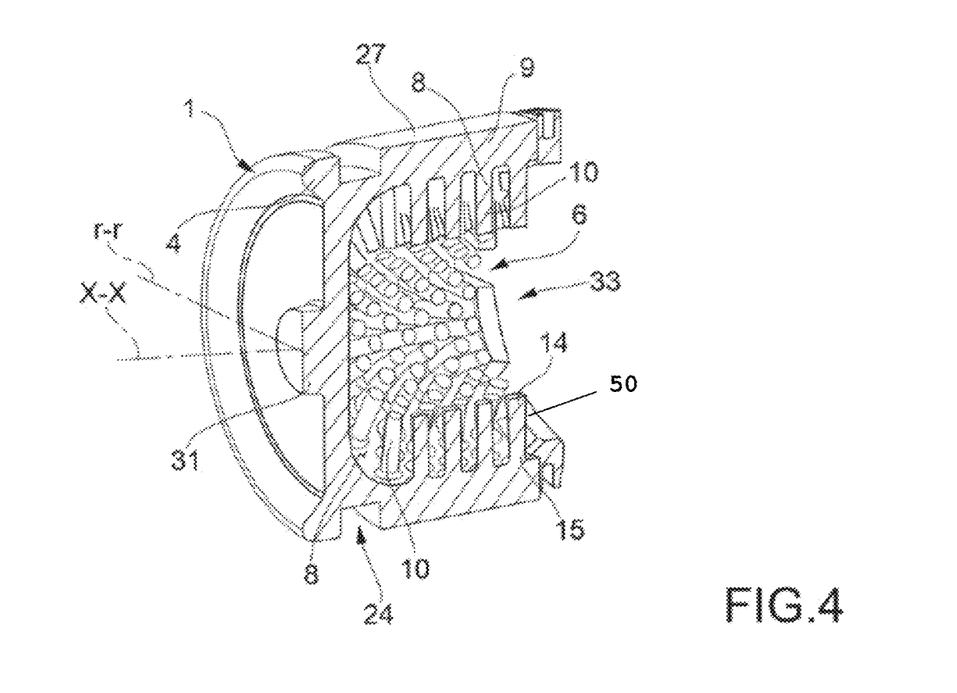
FIGS. 4 and 5 show axonometric and sectional views of a thrust device, according to an embodiment.
Figure 5:
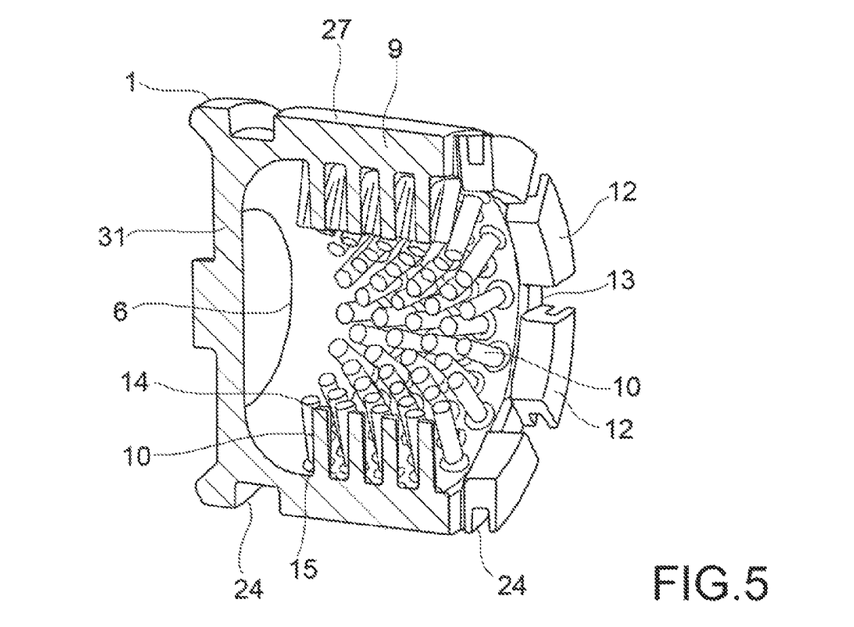
Figure 6:
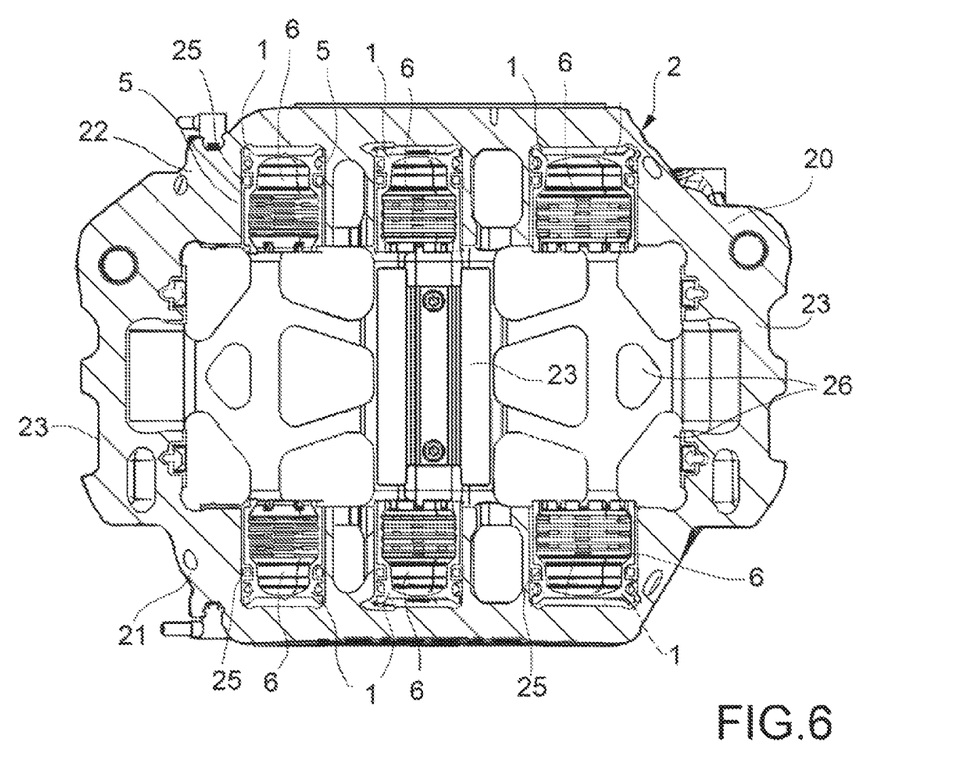
FIG. 6 shows a radially internal sectional view of a brake caliper, according to an embodiment, in which the section is provided according to a cutting plane parallel to the circumferential C-C and axial X-X directions.
Figure 7:
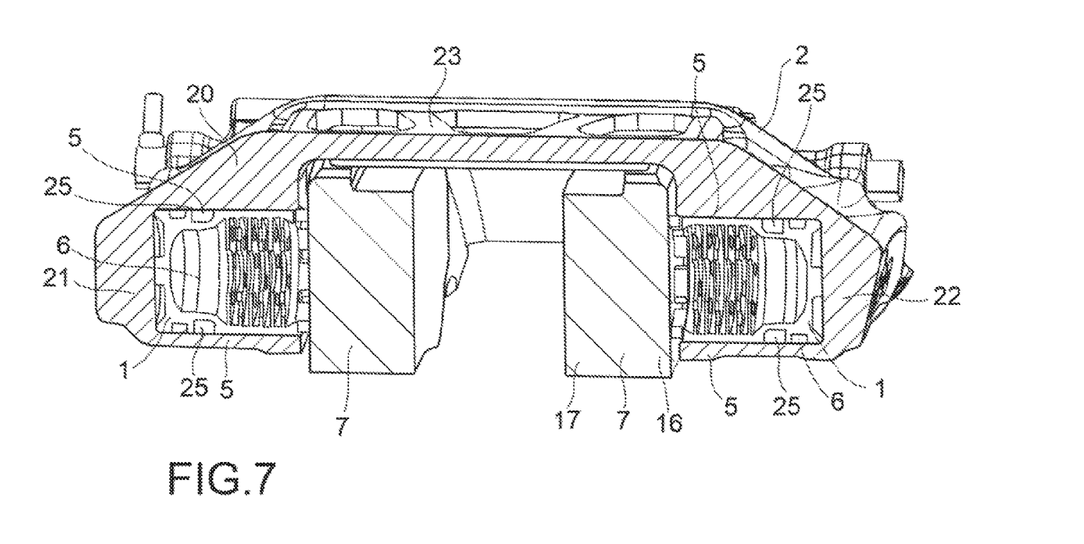
FIG. 7 shows an axonometric and sectional view of the brake caliper shown in FIG. 6, in which the section is provided according to a cutting plane parallel to the radial R-R and axial X-X directions.
Figure 8:
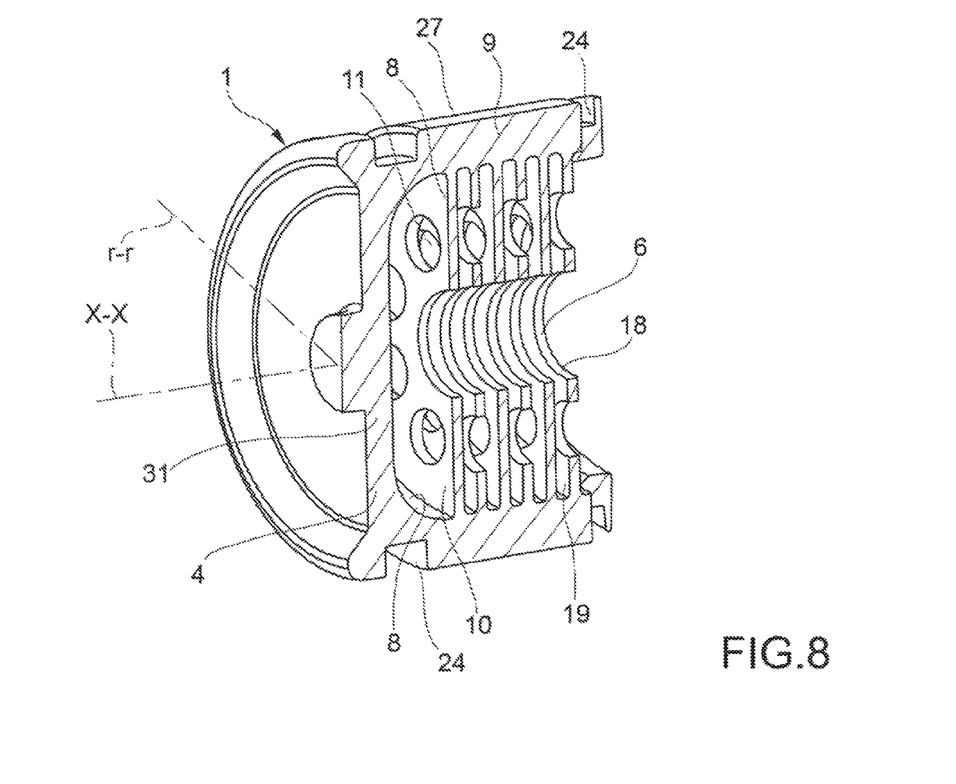
FIGS. 8 and 9 show axonometric and sectional views of a thrust device, according to an embodiment.
Figure 9:
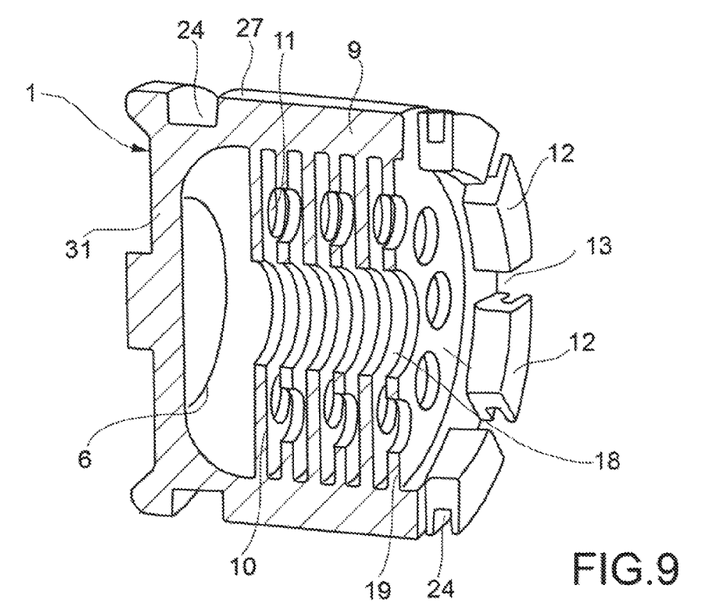
Figure 10:
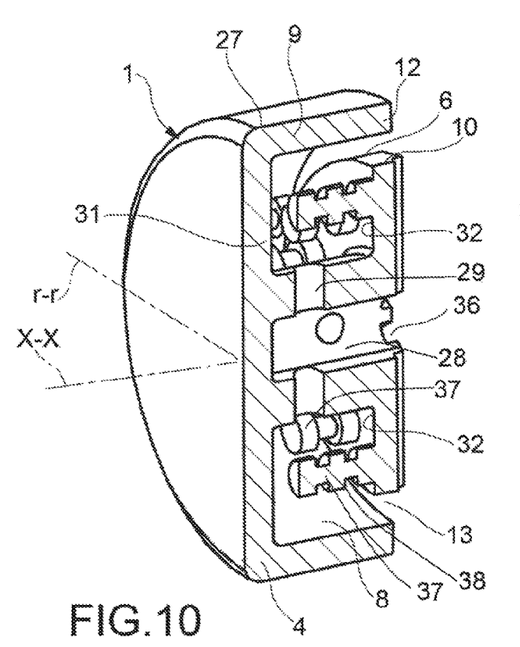
FIGS. 10 and 11 show axonometric and sectional views of a thrust device, according to an embodiment.
Figure 11:
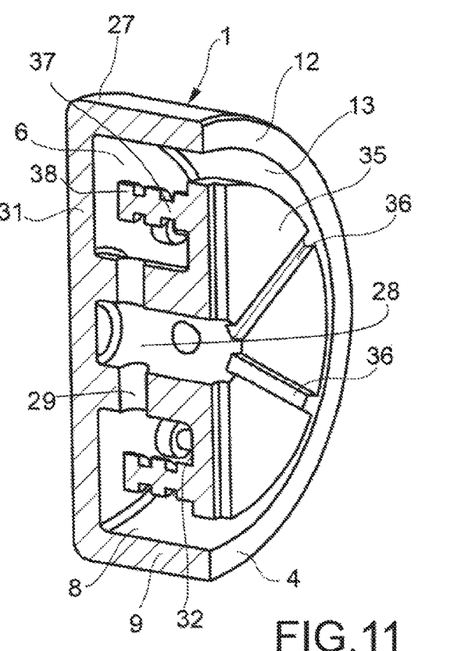

Said disc brake 30 defines an axial direction X-X coincident with or parallel to the axis of rotation of a brake disc 3 of the disc brake 30, a radial direction R-R, substantially orthogonal to said axial direction X-X, and a tangential or circumferential direction C-C, orthogonal both to said axial direction X-X, and to said radial direction R-R. The axial direction X-X is meant to be defined also on a thrust device 1 when considered alone. Said thrust device further defines a thrust device radial direction r-r, orthogonal to said axial direction X-X and incident thereto. Preferably, said guide device 5 is adapted to guide the translation of said thrust device body 4 along the axial direction X-X when in operating conditions.

Said thrust device body 4 defines an internal cavity 6 at least partially open and facing towards the object to be pushed, for example, a brake pad 7 associable with the thrust device 1. Preferably, said brake pad 7 associable with the thrust device 1 comprises a support plate 16 and at least one friction material 17 supported by said support plate 16 and adapted to press against a facing braking surface of the brake disc 3 to exert the braking action. Preferably, said thrust device defines a cavity opening 33, facing axially towards the object to be pushed, for example, said brake pad 7 associable with the thrust device 1.

Said internal cavity 6 being delimited by at least one internal surface 8 defined by at least one wall 9, 31 of the thrust device 1. In other words, said thrust device body 4 comprises at least one wall 9, 31 comprising an internal surface 8 which delimits said internal cavity 6. Preferably, said thrust device body 4 is substantially cup-shaped and comprises a bottom wall 31 and at least one side wall 9. Preferably, said bottom wall 31 and said at least one side wall 9 are as a single piece. In accordance with an embodiment, said at least one side wall 9 defines a cover 27 of the body of the thrust device 4 facing radially opposite with respect to said internal cavity 6, in other words, opposite to said internal cavity in the thrust device radial direction r-r.

Advantageously, from said at least one wall 9, 31 of the thrust device 1 at least one heat dissipation element 10 protrudes into said internal cavity 6, adapted to increase the extension of said at least one internal surface 8 to evacuate the heat accumulated by said at least one wall 9, 31 of the thrust device 1.

In accordance with a preferred embodiment, said thrust device 1 comprises a plurality of heat dissipation elements 10 which protrude into said internal cavity 6 to further increase the extension of said at least one internal surface 8 to evacuate the heat accumulated by said at least one wall 9, 31 of the thrust device 1.

In accordance with an embodiment, said at least one heat dissipation element 10 comprises a plate-like body. For example, said at least one heat dissipation element 10 comprises a body having a predominant extension in a plane orthogonal to the axial direction X-X, and a minimum extension, or minimum thickness, measured in the axial direction X-X.

In accordance with an embodiment, said at least one heat dissipation element 10 comprises a substantially disc-like body. For example, said substantially disc-like body of the at least one heat dissipation element 10 comprises an internal disc edge 18, which substantially protrudes in a cantilever manner in said internal cavity 6, and an external attachment edge 19, forming a connection to the thrust device body 4, and preferably to said at least one wall 8 of the thrust device 1.

In accordance with an embodiment, said disc-like or plate-like body of the at least one heat dissipation element 10 is equipped with at least one through opening 11, preferably facing in the axial direction X-X. In accordance with an embodiment, said disc-like or plate-like body of the at least one heat dissipation element 10 is equipped with a plurality of through openings 11.

In accordance with an embodiment, said thrust device 1 comprises a plurality of heat dissipation elements 10 having a disc-like or plate-like body equipped at least one through opening 11. Preferably, the through openings 11 of said plurality of heat dissipation elements 10 having a disc-like or plate-like body equipped with at least one through opening 11 are axially aligned to one another, to form an air circulation duct substantially extended in the axial direction X-X.

In accordance with an embodiment, said at least one heat dissipation element 10 comprises a column-shaped body, not necessarily of a cylindrical shape. For example, said column-shaped body of the heat dissipation element 10 has a squared shape. In accordance with an embodiment, said column-shaped body of the heat dissipation element 10 has a substantially cylindrical geometry. Preferably, said thrust device 1 comprises a plurality of heat dissipation elements 10 comprising a column-shaped body.

In accordance with an embodiment, said column-shaped body of the heat dissipation element 10 forms a free end 14 which protrudes substantially projecting into said internal cavity 8. Preferably, said column-shaped body of the heat dissipation element 10 further forms an attachment origin 15 which protrudes from said wall 9, 31 of the thrust device 1 and which forms a connection with said wall 9, 31. In accordance with an embodiment, said column-shaped body of the heat dissipation element 10 further comprises a stem portion 50 extending between said attachment origin 15 and said free end 14.

In accordance with an embodiment, said at least one heat dissipation element 10 comprises a body which protrudes into said internal cavity 8 forming at least one portion opposite to the cavity opening 33, or undercut portion 32 opposite to said cavity opening 33, facing axially towards the object to be pushed, for example, said brake pad 7 associable with the thrust device 1. Thereby, said portion opposite to the cavity opening 32 forms a portion placed as undercut with respect to said cavity opening 33.

In accordance with an embodiment, said at least one heat dissipation element 10 comprises a body which protrudes into said internal cavity 8 from said bottom wall 31, forming at least one portion axially opposite to the cavity opening 33, or undercut portion 32 axially opposite with respect to said cavity opening 33, facing axially towards the object to be pushed, for example, said brake pad 7 associable with the thrust device 1, and a portion for the attachment to the bottom wall 31 which forms a connection to said bottom wall 31 of the thrust device body 4. Thereby, said portion axially opposite to the cavity opening 33 forms a portion placed as undercut with respect to said cavity opening 33. Preferably, said at least one undercut portion 32 has a substantially disc-like shape.

In accordance with an embodiment, said at least one through opening for the air passage 13 faces at least in the thrust device radial direction r-r, so as to allow the passage of air from and towards said internal cavity 6 even when the thrust device 1 is in contact with, and preferably pushes, an associable brake pad 7.

In accordance with an embodiment, said at least one wall 9, 31, and, preferably, said at least one side wall 9 of the thrust device 1 comprises an edge 12, adapted to contact a brake pad 7 associable with the thrust device 1, in which said edge 12 delimits at least one through opening for the air passage 13, so as to allow the passage of air from and towards said internal cavity 6.

In accordance with an embodiment, said edge 12 delimits a plurality of through openings for the air passage 13. In accordance with an embodiment, said edge 12 forms a battlement so as to delimit a plurality of through openings for the air passage 13.

In accordance with an embodiment, said at least one wall 9 of the body of the thrust device 4 has an extension in the axial direction X-X lesser than the body of said at least one heat dissipation element 10, so that said heat dissipation element 10 comprises an abutting portion 35, adapted to contact the element to be pushed, for example, a brake pad 7 associable with the thrust device 1, avoiding said wall 9 to contact said element to be pushed, for example said brake pad 7, associable with the thrust device 1.

In accordance with an embodiment, said abutting portion 35 of the heat dissipation element 10 is in a single piece with said undercut portion 32. Preferably, said abutting portion 35 delimits at least one through channel 36, and preferably a plurality of through channels 36, adapted to allow the passage of air from and towards said internal cavity 6 through the body of the heat dissipation element 10. Preferably, said through channels 36 are arranged radially on said abutting portion 35.

In accordance with an embodiment, said abutting portion 35 of the heat dissipation element 10 delimits a thrust device ventilation duct 28 directed in the axial direction X-X and placed in fluid communication with said internal cavity 6, preferably by means of at least one radial passage 29 directed in the thrust device radial direction r-r. Preferably, said heat dissipation element 10 delimits said at least one through channel 36, said thrust device ventilation duct 28 and said at least one radial passage 29. In accordance with an embodiment, said heat dissipation element 10 comprises a plurality of rods 37 which protrude into said internal cavity 6 from said undercut wall 32, forming each a free end and an undercut wall attachment origin 32, so as to increase the extension of the internal surface 9 of the thrust device. For example, said plurality of rods 37 have a cylindrical symmetry shape. Preferably, said plurality of rods 37 comprise a plurality of crowns 38 or flanges 38 which further increase the internal surface 9 of the thrust device.

In accordance with an embodiment, said at least one heat dissipation element 10 is made as a single piece with said thrust device body 4.

In accordance with an embodiment, said at least one heat dissipation element 10 is made as a single piece with said at least one wall 9, 31 of the thrust device 1.

In accordance with an embodiment, said thrust device 1 is an electro-actuated piston. In accordance with an embodiment, said guide device 5 is formed by a threaded member of a screw-nut mechanism.

In accordance with an embodiment, said thrust device 1 is a piston sealingly housed in a cylinder of a hydraulic actuation cylinder-piston unit. In accordance with an embodiment, said guide device 5 is formed by the cylinder of a hydraulic actuation cylinder-piston unit.

In accordance with an embodiment, the thrust device body 4 delimits at least one gasket annular seat 24, adapted to receive a gasket 25, for example, a sealing and/or roll-back and/or knock-back annular gasket. Preferably, said gasket 25 is an elastic gasket, made, for example, of polymeric material, rubber, plastic, which is at least partially housed in said gasket annular seat 24, at the interface between the thrust device body 4 and the guide device 5 of the brake caliper. Preferably, said gasket annular seat 24 faces radially opposite with respect to said cavity 6 and is adapted to face the guide device 5 of the brake caliper.

In accordance with a general embodiment, a brake caliper 2 comprises a caliper body 20 and at least one thrust device 1 according to any one of the embodiments described above.

In accordance with an embodiment, said caliper body 20 is adapted to straddle a brake disc 3 and comprises a first elongated portion 21, adapted to face, directly or indirectly, by means of at least one brake pad 7, a first braking surface of said associable brake disc 3, and a counterposed second elongated portion 22, counterposed to said first elongated portion 21 and adapted to face, directly or indirectly, by means of at least one brake pad 7, a second braking surface, opposite to said first braking surface.

In accordance with an embodiment, said brake caliper 2 is a fixed caliper. Preferably, said brake caliper 2 comprises at least one thrust device 1 associated with said first elongated portion 21 and at least one thrust device 1 associated with said counterposed second elongated portion 22.

In accordance with an embodiment, said brake caliper 2 is a floating caliper. Preferably, said brake caliper 2 comprises at least one thrust device 1 associated with one of said first elongated portion 21 or said counterposed second elongated portion 22.

In accordance with an embodiment, said caliper body 20 further comprises at least one caliper bridge 23 which connects said first elongated portion 21 and said second elongated portion 22 to each other, so as to straddle the brake disc 2. Preferably, said at least one caliper bridge 23 delimits bridge through openings 26 for the evacuation of the heat accumulated by the brake disc 3 when in operating conditions.

In accordance with an embodiment, said caliper body 20 comprises said at least one guide device 5. For example, said guide device 5 is a cylinder of a cylinder-piston unit delimited by said caliper body 20.

In accordance with an embodiment, said brake caliper comprises at least one elastic gasket 25 made, for example, of polymeric material, rubber, plastic, said gasket 25 being housed at least partially in said gasket annular seat 24 of the thrust device body 4 at the interface between said thrust device body 4 and the guide device 5 of the caliper body 20.

In accordance with an general embodiment, a disc brake 30 comprising a brake disc 3 and at least one brake caliper 2 is provided, in which said disc brake 30 defines an axial direction X-X coincident with or parallel to the axis of rotation of a brake disc 3, a radial direction R-R, substantially orthogonal to said axial direction X-X, and a tangential or circumferential direction C-C, orthogonal both to said axial direction X-X, and to said radial direction R-R, and in which said brake caliper 2 comprises a caliper body 20 placed straddling the brake disc 3, and in which said brake caliper 2 further comprises at least one thrust device 1 according to any one of the embodiments described above.

A method for manufacturing a brake caliper thrust device 1 is described below.

In accordance with an general embodiment, a method for manufacturing a brake caliper thrust device 1 for a disc brake comprises the following steps:

providing a thrust device body 4 defining an internal cavity 6 at least partially open and delimited by at least one internal surface 8 of at least one wall 9 of the thrust device 1;

welding on said at least one wall 9, 31 at least one heat dissipation element 10 which protrudes into said internal cavity 6, said at least one heat dissipation element 10 adapted to increase the extension of said at least one internal surface 8 to evacuate the heat accumulated by said at least one wall 9, 31 of the thrust device 1.

Preferably, said method comprises the further step of welding on said at least one wall 9, 31 a plurality of heat dissipation elements 10.

A method for manufacturing a brake caliper thrust device 1 is described below.

In accordance with a general embodiment, a method for manufacturing a brake caliper thrust device 1 for a disc brake comprises the step of providing at least one thrust device, as defined in any one of the embodiments described above, by means of an additive manufacturing technique, or additive manufacturing.

In accordance with an embodiment, said method comprises the step of depositing layers of material on a support. Preferably, said method comprises the step of controlling by means of a computer the placing of layers of material for manufacturing said thrust device 1. In accordance with an embodiment, said additive manufacturing technique is 3D printing. In accordance with an embodiment, said additive manufacturing technique is stereolithography.

In particular embodiments, by virtue of the features described above, provided separately or jointly with respect to one another, a solution to the needs listed above, even when conflicting, may be provided, producing the aforementioned advantages, and in particular:

a thrust device may be achieved, having improved properties for the heat exchange with the air surrounding the disc brake, when in operating conditions, with respect to the known solutions;

the heat exchange surface, or internal surface, of the thrust device is increased with respect to the known solutions, without, thereby, increasing the encumbrance of the thrust device;

such a thrust device is made compatible with brake calipers existing before the present invention, allowing to easily perform retrofitting operations.

at the same time, the brake caliper, comprising at least one of such thrust devices, may be provided with an increased heat exchange surface, as well as with an increased air circulation volume, when in operating conditions, without thereby increasing the encumbrance thereof;

furthermore, an improvement of the performance may be obtained, since the working temperature of the brake caliper decreases with respect to the working temperatures of the known brake calipers; this lowering of the operating temperature is obtained by increasing the heat exchange surface (in fact, the heat is also distributed over the entire internal surface of the thrust device), thus favoring the heat exchange and avoiding high transmission of heat to the caliper body;

furthermore, as the pad, when overheated, is in contact with the abutting portion 35 and the gasket 25, typically made of rubber, is in contact with the cover of the thrust device body 4, an extension of the heat path occurs from the pad towards the gasket itself, and therefore a decreased heating of the gasket itself, when considering a pad operating temperature equal with respect to that of known solutions.

A person skilled in the art, in order to satisfy contingent and specific needs, may modify, adapt and replace numerous elements of the embodiments described above with other functionally equivalent, without however departing from the scope of the following claims.

LIST OF REFERENCES

1. Thrust device
2. Brake caliper
3. Brake disc
4. Thrust device body
5. Guide device
6. Internal cavity of the thrust device
7. Brake pad
8. Internal surface of the thrust device
9. Side wall of the thrust device
10. Heat dissipation element
11. Through opening of the heat dissipation element
12. Edge of the thrust device
13. Air passage opening
14. Free end of the heat dissipation element
15. Attachment origin of the heat dissipation element
16. Support plate
17. Friction material
18. Internal edge of the heat dissipation element
19. Attachment edge of the heat dissipation element
20. Caliper body
21. First elongated portion of the caliper body
22. Second counterposed elongated portion of the caliper body
23. Caliper bridge
24. Gasket annular seat
25. Gasket
26. Bridge opening
27. Cover of the thrust device
28. Axial ventilation duct of the thrust device
29. Passages radial to the axial ventilation duct
30. Disc brake 31. Bottom wall of the thrust device
32. Portion opposite to the opening of the undercut portion of the heat dissipation element
33. Cavity opening
34. Heat dissipation element bottom wall attachment portion
35. Abutting portion of the heat dissipation element
36. Through channel of the abutting portion of the heat dissipation element
37. Rod of the heat dissipation element
38. Rod crown or flange
X-X. Axial direction
R-R. Disc brake radial direction
r-r. Thrust device radial direction
C-C. Circumferential direction

The invention claimed is:
1. A thrust device of a brake caliper for a disc brake, the thrust device comprising
a thrust device body adapted to be translated inside a guide device, said thrust device body defining an internal cavity at least partially open and facing towards an object to be pushed, including a brake pad associable with the thrust device, said internal cavity being delimited by at least one internal surface defined by at least one wall of the thrust device,
said at least one wall of said thrust device body is cup-shaped and comprises a bottom wall and at least one side wall made in a single piece,
wherein from said at least one wall of the thrust device at least one heat dissipation element protrudes into said internal cavity, adapted to increase an extension of said at least one internal surface to evacuate heat accumulated by said at least one wall of the thrust device,
wherein said at least one heat dissipation element comprises a plurality of column-shaped bodies, each body having an attachment end attached to said at least one side wall and a free end extending into said internal cavity.

2. The thrust device of claim 1, wherein each said column-shaped body is of a cylindrical or conical shape.

3. The thrust device of claim 1, wherein said at least one wall of the thrust device comprises an edge adapted to contact the brake pad associable with the thrust device, wherein said edge delimits at least one through opening for air passage, so as to allow passage of air from and towards said internal cavity, and said at least one through opening for air passage faces at least in a thrust device radial direction, so as to allow passage of air from and towards said internal cavity even when the thrust device is in contact with, or pushes the brake pad.

4. The thrust device of claim 1, wherein said at least one wall of the thrust device comprises an edge adapted to contact the brake pad associable with the thrust device, wherein said edge delimits a plurality of through openings for air passage and/or forms a battlement so as to delimit a plurality of through openings for the air passage.

5. The thrust device of claim 1, wherein said at least one wall has an extension in an axial direction shorter than the extension of each body of said at least one heat dissipation element, so that said at least one heat dissipation element comprises an abutting portion, adapted to contact the object to be pushed, avoiding said at least one wall to contact the object to be pushed associable with the thrust device.

6. The thrust device of claim 1, wherein
said at least one heat dissipation element is made as a single piece with said at least one wall of the thrust device, and/or wherein
said at least one heat dissipation element is made by an additive manufacturing technique, or additive manufacturing.

7. The thrust device of claim 1, wherein said thrust device is an electro-actuated piston and/or a piston sealingly housed in a cylinder of a hydraulic actuation cylinder-piston unit.

8. The thrust device of claim 1, wherein said guide device is formed by a threaded member of a screw-nut mechanism and/or by a cylinder of a hydraulic actuation cylinder-piston unit.

9. A brake caliper comprising a caliper body and at least one thrust device comprising a thrust device body, adapted to be translated inside a guide device, said thrust device body defining an internal cavity at least partially open and facing towards an object to be pushed, including a brake pad associable with the thrust device; said internal cavity being delimited by at least one internal surface defined by at least one wall of the thrust device, said at least one wall of said thrust device body is cup-shaped and comprises a bottom wall and at least one side wall made in a single piece, wherein from said at least one wall of the thrust device at least one heat dissipation element protrudes into said internal cavity, adapted to increase an extension of said at least one internal surface to evacuate heat accumulated by said at least one wall of the thrust device,
wherein said at least one heat dissipation element comprises a plurality of axially gapped plates extending into said internal cavity.

10. The thrust device of claim 9, wherein said plurality of axially gapped plates each is equipped with at least one through opening facing in an axial direction.

11. The thrust device of claim 9, wherein said plurality of axially gapped plates each is equipped with a plurality of through openings.

12. The thrust device of claim 9, wherein said plurality of axially gapped plates are each disc-like bodies.

13. A method for manufacturing a brake caliper thrust device for a disc brake, the method comprising:
providing a thrust device body defining an internal cavity at least partially open and delimited by at least one internal surface of at least one wall of the thrust device;
said at least one wall of said thrust device body is cup-shaped and comprises a bottom wall and at least one side wall made in a single piece,
welding on said at least one wall at least one heat dissipation element, said at least one heat dissipation element being adapted to increase the extension of said at least one internal surface to evacuate heat accumulated by said at least one wall of the thrust device,
wherein said at least one heat dissipation element comprises a plurality of circumferentially spaced axially extending rods in said internal cavity.

14. The method of claim 13, wherein said at least one heat dissipation element comprises a body protruding into said internal cavity from said bottom wall, forming at least one portion placed at an opposite side with respect to a cavity opening, that faces axially towards an object to be pushed, including said brake pad associable with the thrust device, and a portion for attachment to the bottom wall which forms a connection with said bottom wall.

15. A method for manufacturing a brake caliper thrust device for a disc brake, the method comprising providing at least one thrust device by means of an additive manufacturing technique, or additive manufacturing, said thrust device comprising a thrust device body adapted to be translated inside a guide device, said thrust device body defining an internal cavity at least partially open and facing towards an object to be pushed, including a brake pad associable with the thrust device; said internal cavity being delimited by at least one internal surface defined by at least one wall of the thrust device, said at least one wall of said thrust device body is cup-shaped and comprises a bottom wall and at least one side wall made in a single piece, wherein from said at least one wall of the thrust device at least one heat dissipation element protrudes into said internal cavity, adapted to increase an extension of said at least one internal surface to evacuate heat accumulated by said at least one wall of the thrust device, wherein said at least one heat dissipation element is selected from the group of a plurality of column-shaped bodies radially extending into said internal cavity, a plurality of axially gapped plates extending into said internal cavity; and a plurality of circumferentially spaced axially extending rods in said internal cavity.

* * * * *